Nov. 22, 1927.

J. T. AUGER

PNEUMATIC TIRE

Filed June 15, 1925

1,650,107

Inventor
JOSEPH T. AUGER

By Paul, Paul & Moore
ATTORNEYS

Patented Nov. 22, 1927.

1,650,107

UNITED STATES PATENT OFFICE.

JOSEPH T. AUGER, OF MINNEAPOLIS, MINNESOTA, ASSIGNOR OF ONE-THIRD TO E. O. VOYER AND ONE-THIRD TO R. H. MONAHAN, BOTH OF MINNEAPOLIS, MINNESOTA.

PNEUMATIC TIRE.

Application filed June 15, 1925. Serial No. 37,313.

This invention relates to new and useful improvements in pneumatic tires in general, and more particularly relates to a reenforcing means adapted to be demountably secured thereto for the purpose of strengthening the tire and to provide means for rendering such a tire substantially punctureproof.

An object of the invention is to provide a demountable tread for a tire having a metal band embedded therein so that when mounted upon the tire it will be practically impossible for a nail or other sharp instrument to pierce the wall of the tire.

A further object of the invention is to provide a re-enforcing means for a standard tire casing comprising a corrugated strip or band of metal adapted to encircle the outer portion of the casing, said band having a suitable fabric and rubber vulcanized thereto so that when the device is mounted upon a casing, the latter will appear as an ordinary standard casing.

A further object of the invention is to provide such a device adapted to be mounted upon old or worn casings, thereby to render such casings useful again.

A further object is to provide a casing reenforcing means comprising a metal band having V-shaped corrugations or grooves formed therein so that when the fabric and rubber are vulcanized thereto the band will be securely held in place.

A further object is to provide a casing reenforcing means of the above character constructed in the form of a re-liner adapted to be mounted within the casing between the walls thereof and the walls of the inner tube mounted therein.

The particular object of the invention, therefore, is an improved pneumatic tire.

Other objects of the invention will appear from the following description and will be pointed out in the annexed claims.

In the drawings there has been disclosed a structure designed to carry out the various objects of the invention but it is to be understood that the invention is not confined to the exact features shown as various changes may be made within the scope of the claims which follow.

In the accompanying drawings forming part of this specification,

Figure 1:
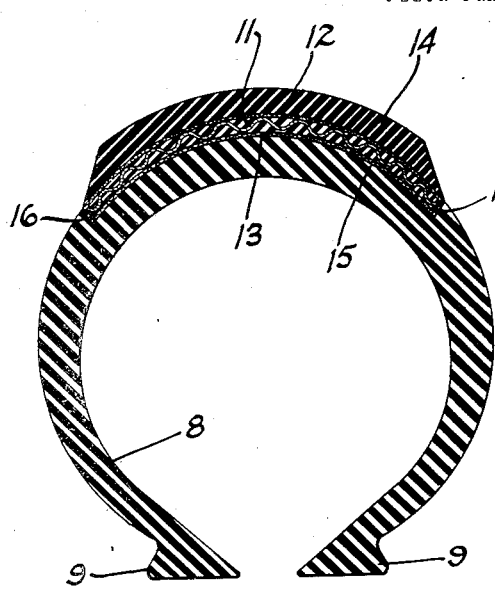
Figure 1 is a cross sectional view of a tire casing showing my invention applied thereto.

In the selected embodiment of the invention here shown, for purposes of disclosure, there is illustrated a common form of tire comprising the walls 8 having the usual beads 9 provided on the inner portions thereof, as shown in Figure 1, which are adapted to be seated in the tire rim in the usual manner when the casing is mounted thereon.

Figure 5:
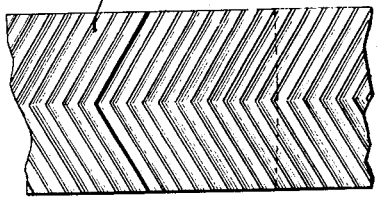
Figure 5 is a plan view of a portion of the metallic reenforcing band showing the preferred method of corrugating or grooving the surface thereof.

The important feature of this invention resides in the novel reenforcing means provided for reenforcing the outer portion of the casing wall, or that portion which is commonly known as the tread. Such means preferably consists of a metallic band 11 preferably having its surface corrugated or grooved as shown in the various figures of the drawing. The corrugations or grooves are preferably V-shaped or arranged as shown in Figure 5, so that when the band 11 is covered with a coating of rubber and fabric it will be securely held in place therein and at the same time provide sufficient flexibility to permit the tire to yield under pressure when engaging obstructions in the roadway.

Figure 2:
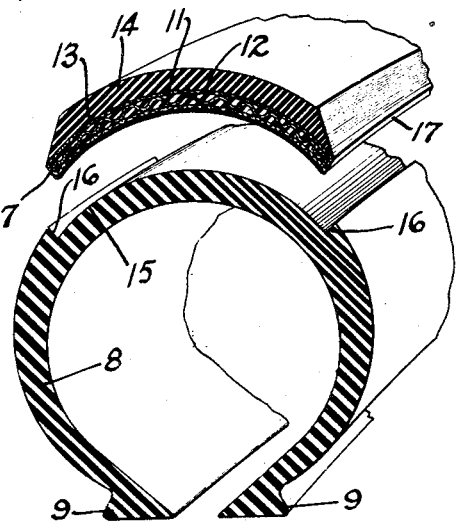
Figure 2 is a similar view showing the reenforcing means or tread separated therefrom.

Referring to Figures 1 and 2, it will be noted that the little valleys or grooves produced by corrugating its surface, are filled with a suitable material such as rubber 12 which is vulcanized thereto in the usual manner. This filler between the corrugations will effectively prevent the plate from creeping or sliding when in use. After the metal band has thus been substantially covered with rubber or a similar suitable material, a layer of fabric 13 is secured thereto after which the usual rubber tread 14 may be vulcanized to the structure as particularly shown in Figures 1 and 2.

A recess or seat 15 is preferably provided in the casing wall having shoulders 16 at each end thereof adapted to engage the faces 17 on the demountable tread when mounted upon the casing as shown in Figure 1.

The band 11 may be constructed in the form of a continuous ring or band or, if desired, it may be made in the form of a strip of suitable length to allow the ends thereof to overlap when the rubber and fabric are secured thereto in the process of constructing the demountable tread. By means of the V-shaped corrugations shown in Figure 5, it will readily be seen that when the device is constructed as above described, the two ends of the band will be interlocked together, thereby eliminating any danger of such ends pulling apart when the device is mounted upon a casing as shown in Figure 1.

Figure 3:
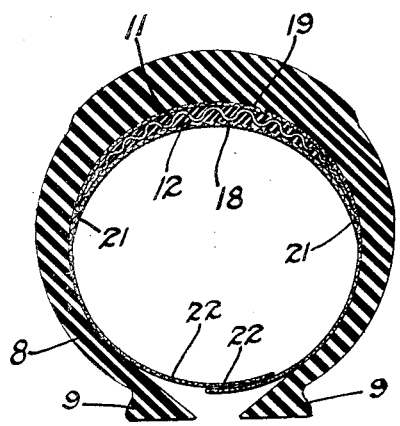
Figure 3 is a view showing the reenforcing means mounted within the casing, same being constructed in the form of a re-liner.
Figure 4:
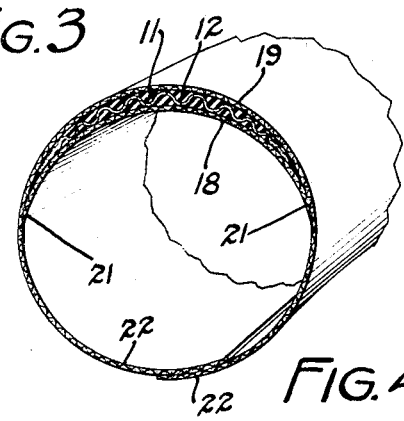
Figure 4 is a view showing the structure shown in Figure 3 removed from the casing.

Figures 3 and 4 show a modified construction wherein the metallic band 11 is imbedded in a re-liner adapted to be mounted within a casing. In the structure here shown, the metal band 11 is imbedded in the outer portion or periphery of the re-liner and is similarly covered with a rubber 12 which is vulcanized thereto and covered with layers of fabric 18 and 19 which are secured together as shown at 21, and have portions 22 extending therefrom adapted to encircle the inner tube (not shown) when mounted therein.

By the use of this novel casing reenforcing means, it will readily be seen that it will be practically impossible for any sharp instrument to pierce the tread of the tire, thereby substantially rendering such a tire puncture-proof. Its construction is also such that it may readily and conveniently be mounted upon old and worn tires of ordinary construction, thereby greatly increasing the life of such tires.

The device is constructed in the following manner. A length of corrugated metal is bent to circular form and the ends interlockingly overlapped and held by the V-shaped corrugations from sliding upon one another either laterally or circumferentially. Coatings of rubber or similar substance having adhesive and cohesive qualities and adapted for vulcanization, are then applied and then a relatively thin casing or covering fabric 13 is secured thereto, after which the band is vulcanized, when a tread 14 is used, the same is then applied and vulcanized as before mentioned.

The V-shaped formation of the corrugations not only prevent the overlapped ends from creeping as above mentioned, but it has been found that circumferential creeping of the fabric-covered band is also prevented, inasmuch as the cover fabric is comparatively thin, and the corrugations act therethrough when overloaded to bite into the recessed tread portion of the casing. Substantially the same action takes place when the device is used as an inner tube. I have also found that by using V-shaped corrugations, little deformation takes place under the heaviest loads, as compared with the other forms of corrugations. Tests have shown that the V-shaped corrugation has forty per cent more strength than other forms. These V-shaped corrugations are also more uniformly flexible. It has been found that with this type of corrugation placed with the apex of the V pointing the direction of travel of the tire and providing a fan-shaped spread in rearwardly direction, an equal pressure at each side of the center of the tire prevents such lateral creeping of the tread 14 as would tend to loosen the same, as well as creeping of the device as a whole within its recess.

I claim as my invention:

1. A pneumatic tire, and a member seated against the tread thereof and having two series of corrugations meeting at the middle of the member, and diverging toward its edges, and a rubber tread element covering, and secured against, the member at the outer side.

2. A vehicle tire and a puncture-proof member seated against the tread and having its ends overlapped, said member having a series of corrugations therein arranged in V-shaped formation transversely of the member, certain of the corrugations at each end of the members being lockingly nested.

3. A vehicle pneumatic tire, in combination with a puncture-proof member having two series of ribs formed therein, the members of the series being divergent toward the edges of the member, and rubber material filling the corrugations, and fabric overlying the filling material.

4. In combination with a vehicle pneumatic tire, a puncture-proof member conforming to the configuration of the tread, fabric sheets between which said member is placed, said member having two series of depressions formed therein, the members of the series being divergent toward the edges of the member, and a suitable filler between said sheets and fitting said depressions.

5. A vehicle pneumatic tire and a puncture-proof member therefor having a series of depressions therein meeting at the middle of the member and divergent toward the edges, a holder in the tread and wherein said member is mounted, and filler material within the holder lying within the depressions on both sides of the member.

6. A vehicle pneumatic tire and a puncture-proof member embedded therein and comprising a plate having corrugations diagonally formed therefrom and diverging from the center of the plate toward the edges thereof.

7. A pneumatic tire having an annular recess in its tread, a puncture-proof member, and a holder therefor fitting said recess and locked therein when the tire is inflated, said puncture-proof member having two series of corrugations meeting at the middle of the member and diverging toward its edges.

8. An armor band for the purpose described comprising a transversely and circumferentially curved metal band having corrugations extending crosswise at an angle to one another, from a point substantially midway of the band outwardly to opposite sides, a layer of adhesive resilient material filling the depressions of the corrugations on both sides of the band, and a layer of fabric encircling the band and adhesively attached to the adhesive layer, the ends of said band being overlapped and having the corrugations nested.

In witness whereof, I have hereunto set my hand this 1st day of June, 1925.

JOSEPH T. AUGER.